United States Patent
Rogenmoser et al.

(10) Patent No.: US 7,100,064 B2
(45) Date of Patent: Aug. 29, 2006

(54) LIMITING PERFORMANCE IN AN INTEGRATED CIRCUIT TO MEET EXPORT RESTRICTIONS

(75) Inventors: Robert Rogenmoser, Santa Clara, CA (US); Michael C. Kim, Fremont, CA (US); Tse-Yu Yeh, Milpitas, CA (US)

(73) Assignee: Broadcom Corporation, Irvine, CA (US)

( * ) Notice: Subject to any disclaimer, the term of this patent is extended or adjusted under 35 U.S.C. 154(b) by 513 days.

(21) Appl. No.: 10/158,468

(22) Filed: May 30, 2002

(65) Prior Publication Data

US 2003/0225999 A1    Dec. 4, 2003

(51) Int. Cl.
G06F 1/30    (2006.01)
G06F 1/32    (2006.01)
G06F 1/06    (2006.01)
G06F 1/08    (2006.01)

(52) U.S. Cl. ............ 713/324; 713/320; 713/500; 713/501

(58) Field of Classification Search .......... 713/324
See application file for complete search history.

(56) References Cited

U.S. PATENT DOCUMENTS

| | | | |
|---|---|---|---|
| 5,469,388 A * | 11/1995 | Park .................... | 365/200 |
| 5,848,007 A * | 12/1998 | Takahashi ............. | 365/200 |
| 5,939,609 A * | 8/1999 | Knapp et al. .......... | 73/1.01 |
| 6,028,756 A * | 2/2000 | Freyman et al. ........ | 361/104 |
| 6,041,000 A | 3/2000 | McClure et al. | |
| 6,094,382 A | 7/2000 | Choi et al. | |
| 6,385,735 B1 * | 5/2002 | Wilson et al. .......... | 713/501 |
| 6,434,632 B1 * | 8/2002 | Hall .................... | 710/14 |

OTHER PUBLICATIONS

"Mtops." Document from Whatis.com, last updated Nov. 17, 1999, printed from web-site "wysiwyg://101/http://whatis.techtarget.com/definiation/0,,sid9_gci212608.00.html" on Apr. 22, 2002, 3 pages.
Fact Sheet, "Export Controls on Computers," The White House, Office of the Press Secretary, Aug. 3, 2000, 3 pages.

(Continued)

Primary Examiner—Lynne H. Browne
Assistant Examiner—Stefan Stoynov
(74) Attorney, Agent, or Firm—Garlick Harrison & Markison

(57) ABSTRACT

An integrated circuit includes at least a first fuse and at least a first processor. Each fuse is in either a conductive state or a non-conductive state. The first processor is configured to operate at one of at least a first issue rate or a second issue rate responsive to the state of the first fuse. The first issue rate is lower than the second issue rate. In another embodiment, the first processor is configured to execute fewer instructions in a period of time responsive to a first state of the conductive state or the non-conductive state of the first fuse than the first processor is configured to execute in the period of time responsive to a second state of the first fuse. A method includes: (i) determining if an integrated circuit comprising at least one processor has a performance rating that exceeds a government-imposed export restriction; and (ii) in response to the performance rating exceeding the export restriction, blowing at least one fuse on the integrated circuit. The processor responds to a blown state of the fuse by executing, during use, fewer instructions per period of time than the processor would otherwise execute.

11 Claims, 8 Drawing Sheets

OTHER PUBLICATIONS

Policy Information, "Review of Export Regulations in Response to International Agreements," Security Export Control Divisional, Ministry of International Trade and Industry, Jun. 2000, 4 pages.

"Export Controls on Computers," The White House, Oct. 6, 1995, 2 pages.

* cited by examiner

LIMITING PERFORMANCE IN AN INTEGRATED CIRCUIT TO MEET EXPORT RESTRICTIONS

BACKGROUND OF THE INVENTION

1. Field of the Invention

This invention is related to the field of integrated circuits and, more particularly, to meeting government-imposed export restrictions for integrated circuits.

2. Description of the Related Art

The governments of various countries may impose export restrictions on high performance computer systems and/or integrated circuits that include processors. The export restrictions may be implemented for security reasons, for example. High performance processing power can be used for simulating weapons designs, such as nuclear weapons. Additionally, high performance processing power can be used to perform powerful encryption and/or to break powerful encryption algorithms.

The government of the United States of America (the "U.S. government") imposes export restrictions on computer systems and integrated circuits that include processors. The export restrictions are based on the performance level of the processors, as measured in Million Theoretical Operations Per Second (MTOPS). The U.S. government defines the maximum MTOPS that may be exported to a particular foreign country. If the MTOPS of a given integrated circuit is less than or equal to the maximum MTOPS, that integrated circuit may be exported to the foreign country. If the MTOPS of the given integrated circuit is greater than the maximum MTOPS, that integrated circuit may not legally be exported to the foreign country unless a specific license is granted by the U.S. government for the particular export transaction. In some cases, the U.S. government may prohibit any export over the MTOPS limit. The manufacturer of an integrated circuit which exceeds the MTOPS limit for a country may either choose not to export the integrated circuit to that country, or may negotiate with the U.S. government for an increase in the maximum MTOPS (or for a license for the export transaction, in some cases).

The U.S. government currently imposes export restrictions on a variety of different countries, grouped into levels (or tiers). Countries in the first tier have no export restrictions applied (any MTOPS level may be exported). Countries in the second tier have a first MTOPS limit below which export is allowed (although record keeping may be required as to what entities the export was made to). Export above the first MTOPS limit is generally not allowed unless an individual license is granted approving each export transaction. Countries in a third tier have a second MTOPS limit lower than the first MTOPS limit, and the second MTOPS limit is used, similar to the first MTOPS limit, for the second tier countries. For countries in a fourth tier, no export is allowed. For practical purposes for many manufacturers, if a given integrated circuit exceeds the applicable MTOPS limit, the manufacturer may not export the integrated circuit to the affected country. The costs of obtaining the license for the transaction may exceed the profit available in the transaction. Also, as mentioned above, the government may not grant the license. Thus, the integrated circuit manufacturer may be prevented from exporting integrated circuits to some countries.

Since the export restrictions are based on the theoretical number of operations performed by the integrated circuit per second, the operating frequency of the integrated circuit is a factor in the MTOPS of the integrated circuit. Typically, manufacturers offer their integrated circuit products at several different operating frequencies (also referred to as "speed grades"). Over time, the speed grades at which an integrated circuit is sold may increase (e.g. as the design is improved, the semiconductor manufacturing process with which the integrated circuit is built is improved, etc.). At some point, the MTOPS of a new speed grade may exceed the MTOPS limit even if lower speed grades do not. Thus, the manufacturer may be forced to limit which speed grades of a given integrated circuit may be exported, even if some speed grades are exportable.

SUMMARY OF THE INVENTION

An integrated circuit may include at least a first fuse and at least a first processor. Each fuse is in either a conductive state or a non-conductive state. The first processor is configured to operate at one of at least a first issue rate or a second issue rate responsive to the state of the first fuse. The first issue rate is lower than the second issue rate. In one embodiment, by blowing the first fuse on the integrated circuit if the integrated circuit exceeds a government-imposed export restriction, the integrated circuit may be made to meet the export restriction.

In another embodiment, an integrated circuit may include at least a first fuse and at least a first processor. Each fuse is in either a conductive state or a non-conductive state. The first processor is configured to execute fewer instructions in a period of time responsive to a first state of the conductive state or the non-conductive state of the first fuse than the first processor is configured to execute in the period of time responsive to a second state of the conductive state or the non-conductive state of the first fuse.

A method is contemplated, including: (i) determining if an integrated circuit comprising at least one processor has a performance rating that exceeds a government-imposed export restriction; and (ii) in response to the performance rating exceeding the export restriction, blowing at least one fuse on the integrated circuit. The processor responds to a blown state of the fuse by executing, during use, fewer instructions per period of time than the processor would otherwise execute.

BRIEF DESCRIPTION OF THE DRAWINGS

The following detailed description makes reference to the accompanying drawings, which are now briefly described.

Figure 1:
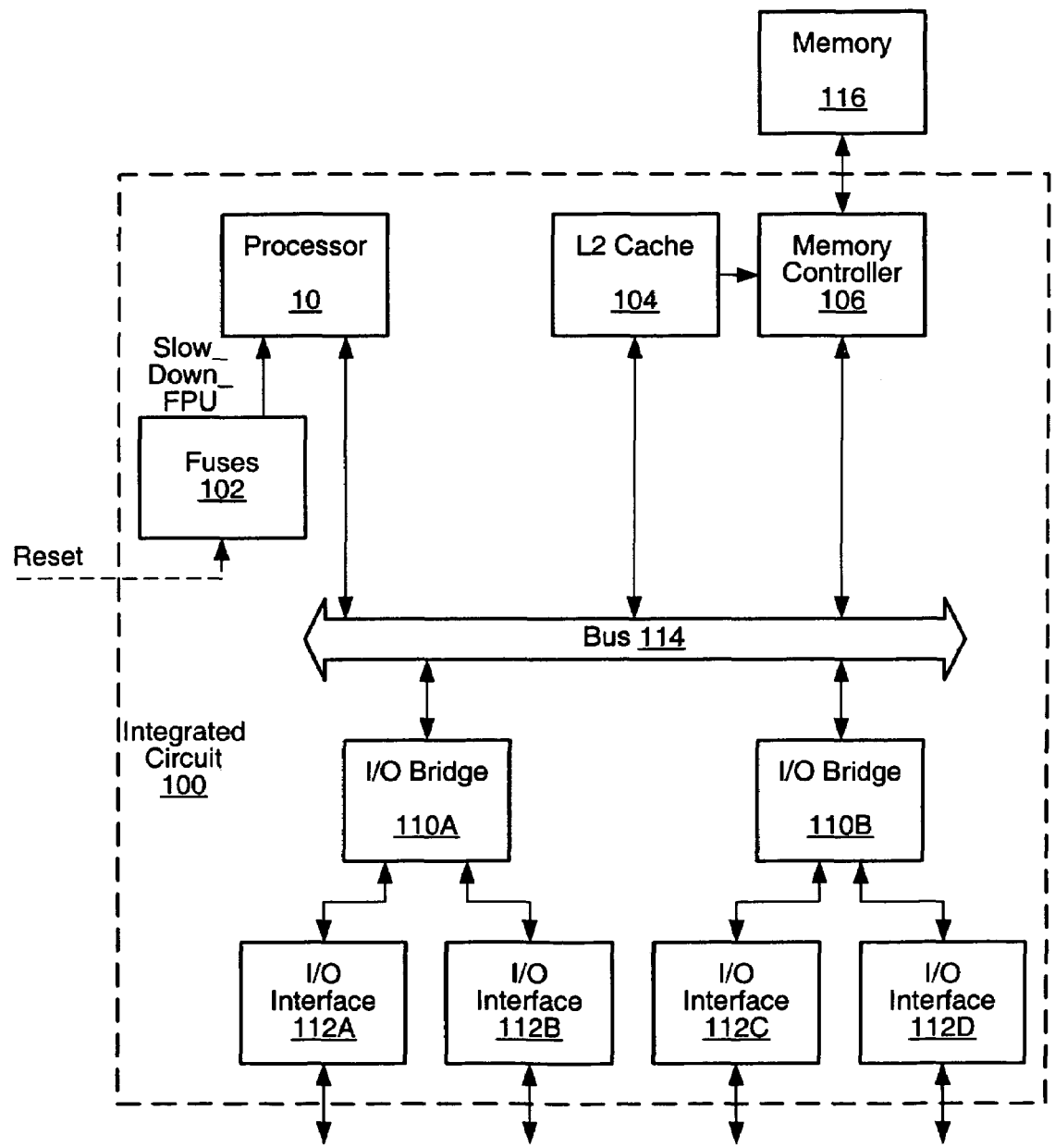
FIG. 1 is a block diagram of one embodiment of an integrated circuit including a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

An integrated circuit including one or more processors may include one or more fuses. The processors may be configured to operate at different performance levels based on the state of the fuses. During testing of the integrated circuit, the MTOPS of the integrated circuit may be determined. If the MTOPS of the integrated circuit exceeds the export restrictions applicable to a particular country and the integrated circuit is to be exported to that country, then one or more of the fuses may be blown to reduce the MTOPS of the integrated circuit to meet the export restriction (i.e. the reduced MTOPS is less than or equal to the MTOPS specified for that country). In this manner, the integrated circuit may still be export to that country.

The processors may reduce the performance level in any desired fashion. For example, in one embodiment, the processors may operate with different issue rates dependent on the state of the fuses. As used herein, the term "issue rate" refers to the number of instructions issued per period of time (e.g. a clock cycle of the clock for the processor, or a fixed period of time independent of the clock cycle). The issue rate may be reduced in a number of ways. For example, the number of instructions issued per clock cycle may be reduced (e.g. by inhibiting issue of instructions to certain execution units). Alternatively, an instruction may be issued to a given execution unit at most one every N clock cycles (where N is an integer greater than 1). Combinations of inhibiting issue to an execution unit and limiting issue to once every N clock cycles may also be used. In yet another alternative, the clock frequency of the clock which controls the processors may be reduced, thus reducing the issue rate over a fixed period of time. In another embodiment, the processors may execute fewer instructions per period of time if the fuses have been blown than the processors would otherwise execute in that period of time.

In one particular implementation, the execution of floating point instructions may provide the largest contribution to the MTOPS of a processor. In this implementation, the processor may reduce the issue rate of floating point instructions to reduce the MTOPS of the integrated circuit. In other embodiments, the issue rate of other types of instructions may be reduced.

Depending on the level of granularity desired, the performance level of a processor may be dependent on one or more fuses. If the performance level is dependent on one fuse, the processor may have a high performance level (e.g. high issue rate) based on one state of the fuse and a lower performance level (e.g. lower issue rate) based on the opposite state of the fuse. If the performance level of the processor is dependent on two fuses, the processor may have up to four different performance levels controlled by the four possible combinations of fuse state. Any number of fuses may be used.

As used herein, a "fuse" is any material which, when initially fabricated on an integrated circuit, has either a conductive or a non-conductive state and which, subsequent to fabrication, can be rendered into the opposite state using an external stimulus. The rendering may be essentially permanent (i.e. very difficult, or practically impossible, to reverse). Rendering the fuse into its opposite state is referred to herein as "blowing" the fuse. That is, the fuse may be initially fabricated in a conductive state (conducting current) and may be rendered non-conductive. Alternatively, the fuse may be initially fabricated in a non-conductive state (not conducting current) and may be rendered conductive. In one example below, the fuse may comprise a wire which is fabricated on the top layer of metal of the integrated circuit (i.e. the last metal layer added during fabrication of the integrated circuit 100). The wire fuse may initially be conductive, and may be cut using an external stimulus (e.g. a laser beam) to render the wire non-conductive. Other fuses may be used in other embodiments. The external stimulus may be of any type, depending on the construction of the fuse (e.g. electrical current, light, etc. may be used as stimuli).

Illustrated in FIGS. 1–3 (and described in more detail below) are various exemplary embodiments integrated circuits that include processors. The embodiments shown also include a variety of other components (e.g. caches, memory controllers, I/O bridges and devices, etc.). In other embodiments, an integrated circuit may include only one or more processors, or one or more processors and any subset of the components shown in FIGS. 1–3, or one or more processors and any subset or superset of the components and other components not shown in FIGS. 1–3.

Exemplary Integrated Circuits

Turning now to FIG. 1, a block diagram of one embodiment of a integrated circuit 100 is shown. Other embodiments are possible and contemplated. In the embodiment of FIG. 1, the integrated circuit 100 includes a processor 10, an L2 cache 104, a memory controller 106, a pair of input/output (I/O) bridges 110A–110B, I/O interfaces 112A–112D, and a set of one or more fuses 102. The fuses 102 may optionally be coupled to receive a reset signal (dotted arrow in FIG. 1). The integrated circuit 100 may include a bus 114 for interconnecting the various components of the integrated circuit 100. As illustrated in FIG. 1, each of the processor 10, the L2 cache 104, the memory controller 106, and the I/O bridges 110A–110B are coupled to the bus 114. The I/O bridge 110A is coupled to the I/O interfaces 112A–112B, and the I/O bridge 110B is coupled to the I/O interfaces 112C–112D. The L2 cache 104 is coupled to the memory controller 106, which is further coupled to a memory 116. The processor 10 is coupled to receive a Slow_Down_FPU signal from the fuses 102.

The processor 10 may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture.

For an embodiment employing the MIPS instruction set, a floating point instruction may include up to four operations as defined for MTOPS. Certain instructions in the MIPS instruction set operate on paired floating point input operands to produce paired floating point results (that is, each input operand is two floating point values and the result is two floating point values). These instructions are often referred to as the "paired single" instructions, as a group. Thus, each paired single instruction performs 2 arithmetic operations (one operation on each of the pairs to produce one of the pair of results). One of the paired single instructions is a multiply-add instruction that multiplies two input operand pairs and adds a third input operand pair to produce a result, thus counting for 4 operations in the MTOPS formula. On the other hand, other types of instructions (e.g. integer and load/store) in the MIPS instruction set may each perform only one operation according to the MTOPS formula. Thus, by reducing the rate at which floating point instructions are executed, the MTOPS for the integrated circuit 100 may be reduced substantially. In other embodiments, the issue rate of other types of instructions may be reduced to provide finer-grain reductions in the MTOPS for the integrated circuit 100.

For this embodiment, a fuse may be used to control the Slow_Down_FPU signal. More particularly, if the fuse is not blown, the Slow_Down_FPU signal may be deasserted. If the fuse is blown, the Slow_Down_FPU signal may be asserted. The processor 10, in response to the deasserted Slow_Down_FPU signal, issues instructions at its maximum rate. On the other hand, in response to an asserted Slow_Down_FPU signal, the processor 10 may issue floating point instructions at a lower rate.

Figure 8:
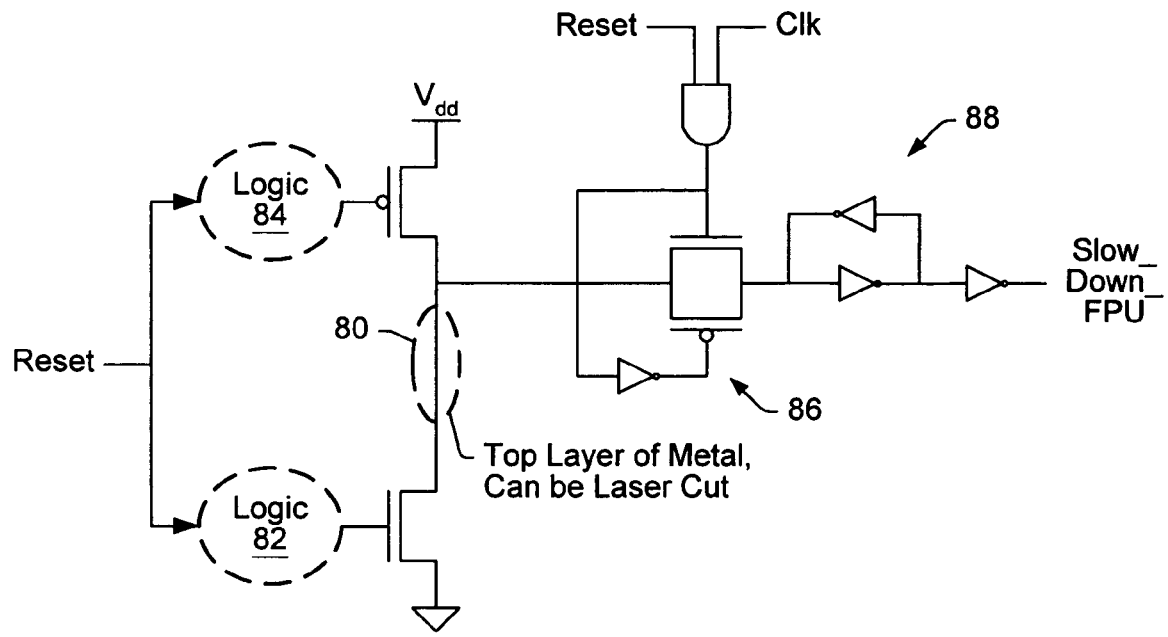
FIG. 8 is a circuit diagram illustrating one embodiment of a fuse and related circuitry.

In one implementation, the state of the fuses 102 may be sampled at reset of the integrated circuit 100 to generate the Slow_Down_FPU signal. In such an embodiment, the reset signal may be supplied to the fuses 102 for sampling the fuse state. In some embodiments, the clock used by the integrated circuit 100 (not shown in FIG. 1) may also be used to control the sampling of the state of the fuses 102. An exemplary fuse and related circuitry which may be used in one embodiment is shown in FIG. 8 and described in more detail below.

The L2 cache 104 is a high speed cache memory. The L2 cache 104 is referred to as "L2" since the processor 10 may employ internal level 1 ("L1") caches. If L1 caches are not included in the processor 10, the L2 cache 104 may be an L1 cache. Furthermore, if multiple levels of caching are included in the processor 10, the L2 cache 104 may be an outer level cache than L2. The L2 cache 104 may employ any organization, including direct mapped, set associative, and fully associative organizations. In one particular implementation, the L2 cache 104 may be a set associative cache (e.g. 4 way set associative, although any associativity may be used) having 32 byte cache lines.

The memory controller 106 is configured to access the memory 116 in response to memory transactions received on the bus 114. The memory controller 106 receives a hit signal from the L2 cache 104, and if a hit is detected in the L2 cache 104 for a memory transaction, the memory controller 106 does not respond to that memory transaction. Other embodiments may not include the L2 cache 104 and the memory controller 106 may respond to each memory transaction. If a miss is detected by the L2 cache 104, or the memory transaction is non-cacheable, the memory controller 106 may access the memory 116 to perform the read or write operation. The memory controller 106 may be designed to access any of a variety of types of memory. For example, the memory controller 106 may be designed for synchronous dynamic random access memory (SDRAM), and more particularly double data rate (DDR) SDRAM. Alternatively, the memory controller 106 may be designed for DRAM, Rambus DRAM (RDRAM), SRAM, or any other suitable memory device.

The I/O bridges 110A–110B link one or more I/O interfaces (e.g. the I/O interfaces 112A–112B for the I/O bridge 110A and the I/O interfaces 112C–112D for the I/O bridge 110B) to the bus 114. The I/O bridges 110A–110B may serve to reduce the electrical loading on the bus 114 if more than one I/O interface 112A–112B is bridged by that I/O bridge. Generally, the I/O bridge 110A performs transactions on bus 114 on behalf of I/0 interfaces 112A–112B and relays transactions targeted at an I/O interface 112A–112B from the bus 114 to that I/O interface 112A–112B. Similarly, the I/O bridge 110B generally performs transactions on the bus 114 on behalf of the I/O interfaces 112C–112D and relays transactions targeted at an I/O interface 112C–112D from the bus 114 to that I/O interface 112C–112D. In one implementation, the I/O bridge 110A may be a bridge to a PCI interface (e.g. the I/O interface 112A) and to a HyperTransport™ I/O fabric (e.g. I/O interface 112B). Other I/O interfaces may be bridged by the I/O bridge 110B. Other implementations may bridge any combination of I/O interfaces using any combination of I/O bridges. The I/O interfaces 112A–112D may include one or more serial interfaces, Personal Computer Memory Card International Association (PCMCIA) interfaces, Ethernet interfaces (e.g. media access control level interfaces), Peripheral Component Interconnect (PCI) interfaces, HyperTransport™ interfaces, etc. In other embodiments, I/O devices may be incorporated as well.

The bus 114 may be a split transaction bus, in one embodiment. The bus 114 may employ a distributed arbitration scheme, in one embodiment. In one embodiment, the bus 114 may be pipelined. The bus 114 may employ any suitable signalling technique. For example, in one embodiment, differential signalling may be used for high speed signal transmission. Other embodiments may employ any other signalling technique (e.g. TTL, CMOS, GTL, HSTL, etc.).

It is noted that, while the illustrated embodiment employs a split transaction bus with separate arbitration for the address and data buses, other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, the bus 114 may not be pipelined, if desired. Other embodiments may use other communications media (e.g. packet based transmission, clock-forwarded links, point to point interconnect, etc.).

It is noted that, while FIG. 1 illustrates the I/O interfaces 112A–112D coupled through the I/O bridges 11A–110B to the bus 114, other embodiments may include one or more I/O interfaces directly coupled to the bus 114, if desired.

Figure 2:
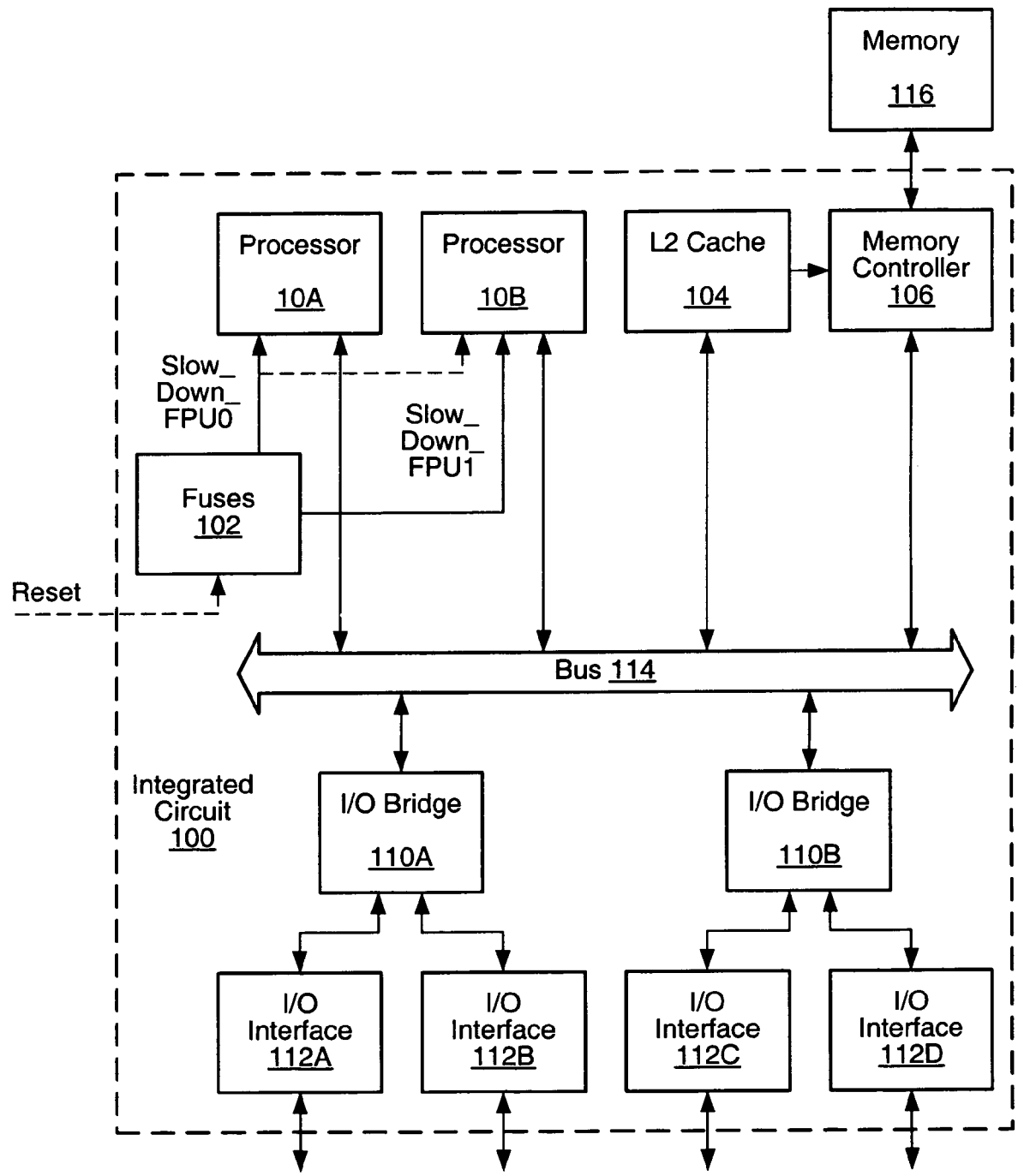
FIG. 2 is a block diagram of a second embodiment of an integrated circuit including two processors.

Turning now to FIG. 2, a block diagram of a second embodiment of the integrated circuit 100 is shown. Other embodiments are possible and contemplated. The embodiment of FIG. 2 is similar to the embodiment of FIG. 1, except that two processors (processors 10A and 10B) are included. In the illustrated embodiment, each processor 10A–10B is coupled to receive a separate signal from the fuses 102 (the Slow_Down_FPU0 signal for the processor 10A and the Slow_Down_FPU1 signal for the processor 10B).

Each of the Slow_Down_FPU signals shown in FIG. 2 may be controlled by separate fuses similar to the discussion above with respect to FIG. 1. Thus, depending on the amount of MTOPS reduction desired, one or both of the fuses controlling the Slow_Down_FPU0 and Slow_Down_FPU1 signals may be blown. That is, one processor 10A–10B may issue instructions at the higher issue rate while the other processor 10A–10B issues instructions at the lower issue rate, if such a configuration results in MTOPS that meet the applicable export restriction. On the other hand, both processors may issue instructions at the lower rate, if desired, to meet the applicable export restriction.

In other embodiments, fewer fuses may be used and a single Slow_Down_FPU signal may be used to control the issue rates of each processor 10A-10B, as illustrated by the dashed line in FIG. 2 from the Slow_Down_FPU0 signal to the processor 10B. In such an alternative, the Slow_Down_FPU1 signal may be eliminated.

Figure 3:
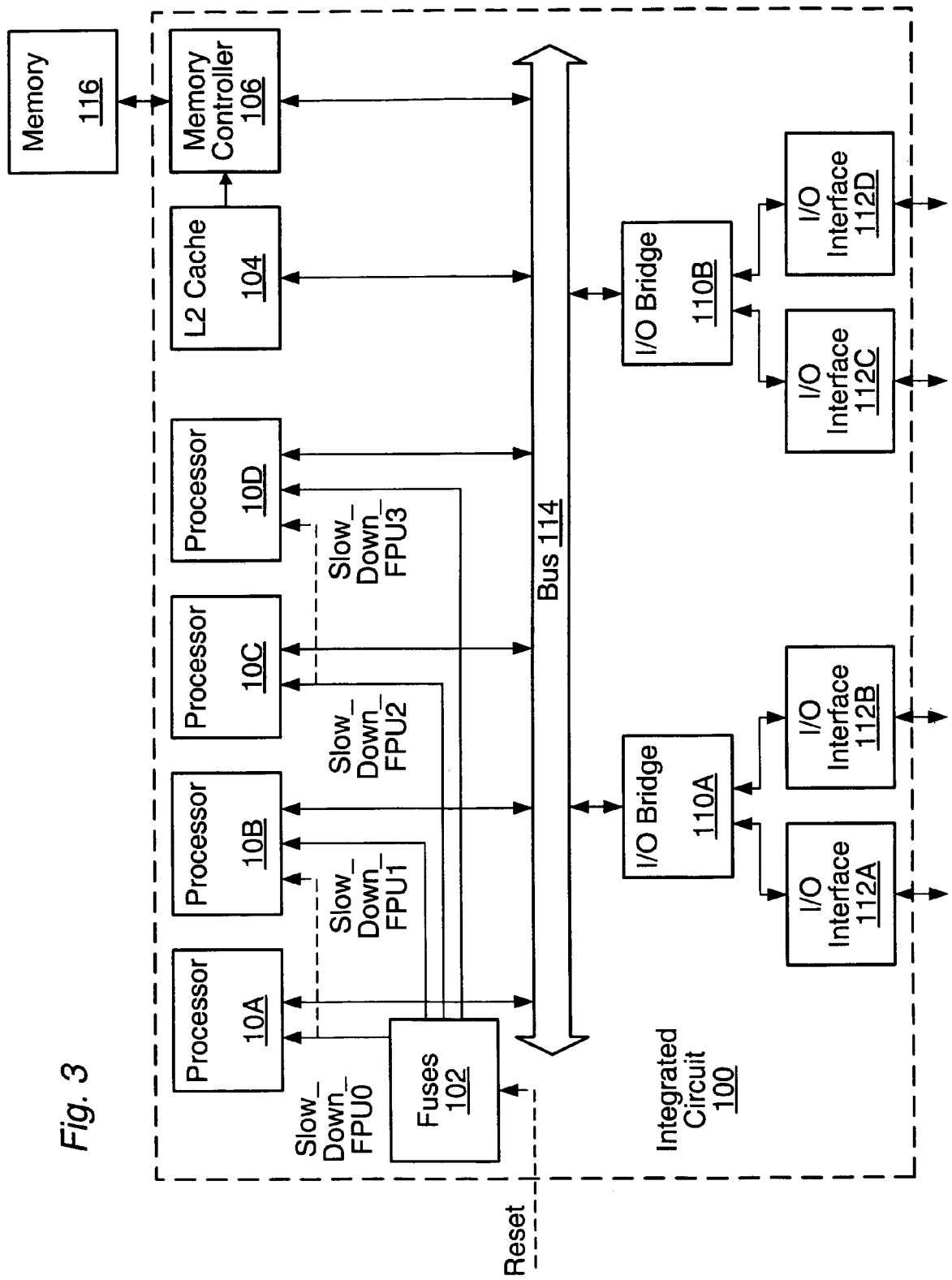
FIG. 3 is a block diagram of a third embodiment of an integrated circuit including four processors.

Turning next to FIG. 3, a block diagram of a third embodiment of the integrated circuit 100 is shown. Other embodiments are possible and contemplated. The embodiment of FIG. 3 is similar to the embodiment of FIG. 1, except that four processors (processors 10A, 10B, 10C, and 10D) are included. In the illustrated embodiment, each processor 10A–10D is coupled to receive a separate signal from the fuses 102 (the Slow_Down_FPU0 signal for the processor 10A, the Slow_Down_FPU1 signal for the processor 10B, the Slow_Down_FPU2 signal for the processor 10C, and the Slow_Down_FPU3 signal for the processor 10D).

Similar to the discussion above with regard to FIG. 2, each of the Slow_Down_FPU signals shown in FIG. 3 may be controlled by separate fuses and one or more fuses may be blown based on the amount of MTOPS reduction desired. Alternatively, fewer fuses may be used and the combination of fuses may be used to control the Slow_Down_FPU signals. For example, in the embodiment of FIG. 3, two fuses may be used. The four possible states of the two fuses may be used to determine how many of the Slow_Down_FPU signals to assert. In yet another alternative, two or more processors 10A–10D may share Slow_Down_FPU signal. For example, the dashed lines in FIG. 3 illustrate processors 10A–10B sharing the Slow_Down_FPU0 signal and the processors 10C–10D sharing the Slow_Down_FPU2 signal. The Slow_Down_FPU1 and Slow_Down_FPU3 signals may be eliminated in such an embodiment. In yet another alternative, the processors 10A–10B may share a signal and the processors 10C and 10D may each receive separate signals. Still further, the processors 10A–10D may all share the same Slow_Down_FPU signal.

While the embodiments of FIGS. 1–3 illustrate one, two, and four processors, respectively, various embodiments may employ any number of processors, as desired, controlled by Slow_Down_FPU signals in any configuration (shared, individually controlled, partially shared, etc.).

Exemplary Processor

Figure 4:
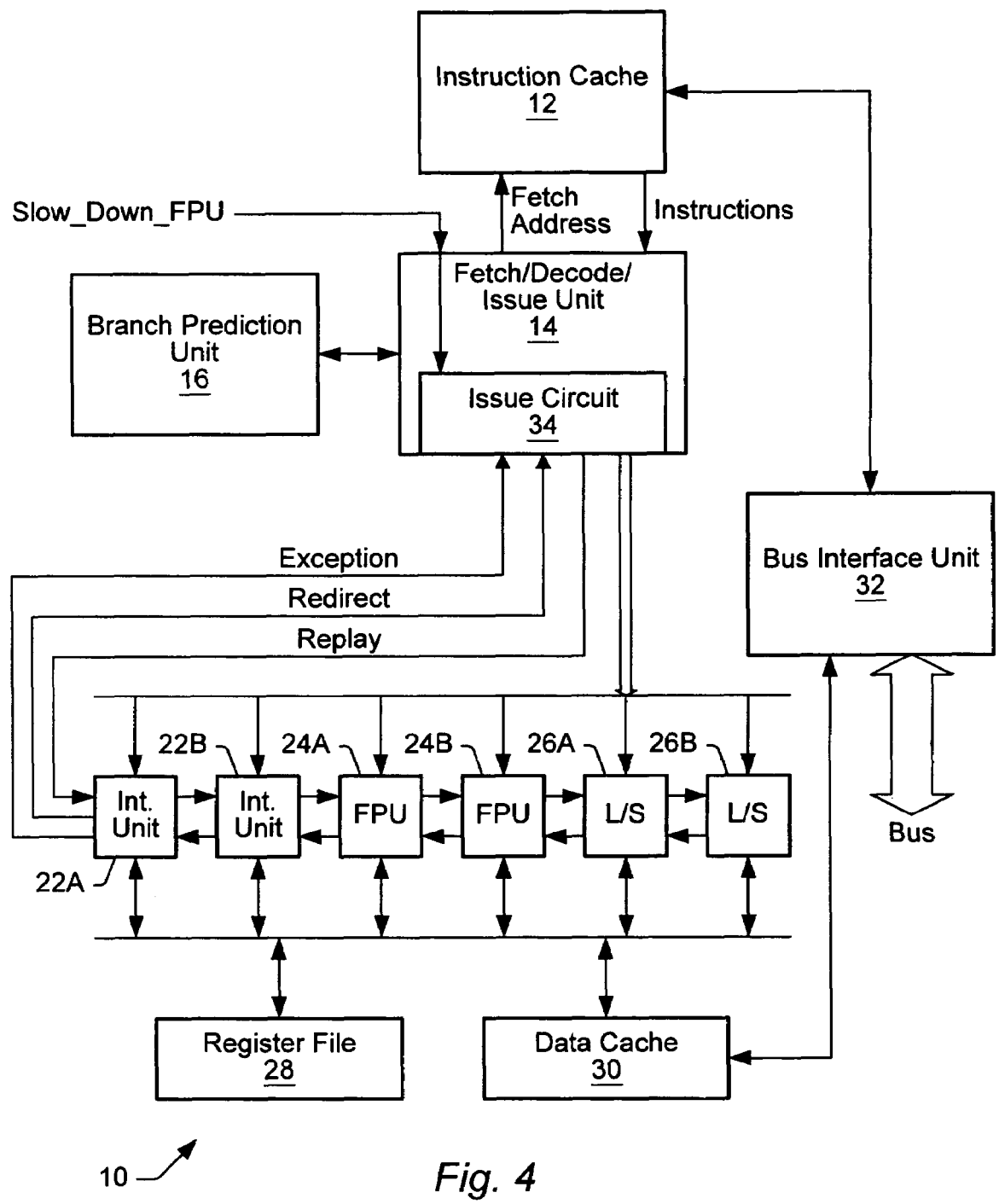
FIG. 4 is a block diagram of one embodiment of a processor which may be included in any of the integrated circuits shown in FIGS. 1–3.

Turning now to FIG. 4, a block diagram of one embodiment of the processor 10 is shown. Other embodiments are possible and contemplated. The embodiment of FIG. 4 may be used as the processor 10 in FIG. 1, or as any or all of the processors 10A–10D shown in FIGS. 2 and 3. In the embodiment of FIG. 4, the processor 10 includes an instruction cache 12, a fetch/decode/issue unit 14, a branch prediction unit 16, a set of integer execution units 22A–22B, a set of floating point execution units 24A–24B, a set of load/store execution units 26A–26B, a register file 28, a data cache 30, and a bus interface unit 32. The instruction cache 12 is coupled to the bus interface unit 32, and is coupled to receive a fetch address from, and provide corresponding instructions to, the fetch/decode/issue unit 14. The fetch/decode/issue unit 14 is further coupled to the branch prediction unit 16 and the execution units 22A–22B, 24A–24B, and 26A–26B. The fetch/decode/issue unit 14 is coupled to provide instructions for execution to the execution units 22A–22B, 24A–24B, and 26A–26B. The execution units 22A–22B, 24A–24B, and 26A–26B are generally coupled to the register file 28 and the data cache 30, and the data cache 30 is coupled to the bus interface unit 32. The fetch/decode/issue unit 14 is coupled to receive the Slow_Down_FPU signal. Particularly, the fetch/decode/issue unit 14 includes an issue circuit 34 which is coupled to receive the Slow_Down_FPU signal.

The issue circuit 34 is configured to issue instructions to the execution units 22A–22B, 24A–24B, and 26A–26B. If the Slow_Down_FPU signal is not asserted, the issue circuit 34 may attempt to maximize the number of instructions issued to the execution units 22A–22B, 24A–24B, and 26A–26B (i.e. the issue circuit 34 may operate at a high issue rate). If the Slow_Down_FPU signal is asserted, the issue circuit 34 may reduce the issue rate. Particularly, the issue circuit 34 may inhibit issue to the second floating point execution unit 24B. The issue circuit 34 may issue floating point instructions to the first floating point execution unit 24A, but may limit the issuance of the multiply-add instruction to once every 4 clock cycles. In one particular embodiment, the issue circuit 34 may use the same issue rules used when floating point exceptions are enabled.

By reducing the rate at which floating point instructions are executed, the MTOPS for the integrated circuit 100 may be reduced substantially for embodiments employing the MIPS instruction set. Each execution unit 22A–22B, 24A–24B, or 26A–26B (wherein an execution unit is defined as a circuit which can receive at most one instruction for execution during a given clock cycle) in the processor 10 may have a maximum number of operations (for MTOPS purposes) that may be issued to it per clock cycle. For integer and load/store execution units, the number may be 1, while the floating point execution units may receive up to 4 (as mentioned above with regard to FIG. 1, for a paired single multiply-add (Madd)).

In the MTOPS calculation for the integrated circuit 100 and the processor 10, the highest performance execution unit is counted at 100% and other execution units are counted at 75%. The maximum number of operations listed above, scaled in this fashion, may be summed and multiplied by the operating frequency of the processor 10 (and various other scaling factors) to calculate the MTOPS. The operating frequency of the processor 10 may be the same as the operating frequency of the integrated circuit 100, or may be a multiple of the operating frequency of the integrated circuit 100. The operating frequency is the frequency of the clock (not shown) during use.

Thus, during normal issue operation, the floating point unit 24A's 4 operations may be counted at 100%, the floating point unit 24B's 4 operations may be counted at 75%, and the remaining execution unit's 1 operation each may be counted at 75% for a total of 10 theoretical operations/clock cycle. On the other hand, if the Slow_Down_FPU signal is asserted, the floating point unit 24B does not receive instructions and thus has 0 operations per clock cycle. Additionally, limiting the floating point Madd to once per 4 clock cycles reduces the floating point unit 24A's maximum theoretical operation per clock cycle to 2 (one paired single operation). Thus, the total theoretical operations/clock cycle may be reduced to 5 (100% of the 2 operations for the floating point execution unit 24A and 75% of the 1 operation for each of the execution units 22A–22B and 26A–26B).

In other embodiments, the issue circuit 34 may use any combination of inhibiting issue to an execution unit and/or limiting issue to an execution unit to once every N clock cycles. In yet other embodiments, the processor 10 may limit the number of instructions executed per period of time in other fashions besides controlling the issue rate. For example, embodiments may employ clock gating to gate the clocks of processor 10 periodically (e.g. once every N clock cycles). Alternatively, fewer instructions may be fetched from the instruction cache 12 per clock cycle. Any mechanism may be used.

Generally speaking, the fetch/decode/issue unit 14 is configured to generate fetch addresses for the instruction cache 12 and to receive corresponding instructions therefrom. The fetch/decode/issue unit 14 uses branch prediction information to generate the fetch addresses, to allow for speculative fetching of instructions prior to execution of the corresponding branch instructions. Specifically, in one embodiment, the branch prediction unit 16 include an array of branch predictors indexed by the branch address (e.g. the typical two bit counters which are incremented when the corresponding branch is taken, saturating at 11 in binary, and decremented when the corresponding branch is not taken, saturating at 00 in binary, with the most significant bit indicating taken or not taken). While any size and configuration may be used, one implementation of the branch predictors 16 may be 4 k entries in a direct-mapped configuration. Additionally, in one embodiment, the branch prediction unit 16 may include a branch target buffer comprising an array of branch target addresses. The target addresses may be previously generated target addresses of any type of branch, or just those of indirect branches. Again, while any configuration may be used, one implementation may provide 64 entries in the branch target buffer. Still further, an embodiment may include a return stack used to store link addresses of branch instructions which update a link resource ("branch and link" instructions). The fetch/decode/issue unit 14 may provide link addresses when branch instructions which update the link register are fetched for pushing on the return stack, and the return stack may provide the address from the top entry of the return stack as a predicted return address. While any configuration may be used, one implementation may provide 8 entries in the return stack.

The fetch/decode/issue unit 14 decodes the fetched instructions and queues them in one or more issue queues for issue to the appropriate execution units. The instructions may be speculatively issued by the issue circuit 34 to the appropriate execution units, again prior to execution/resolution of the branch instructions which cause the instructions to be speculative. In some embodiments, out of order execution may be employed (e.g. instructions may be issued in a different order than the program order). In other embodiments, in order execution may be used. However, some speculative issue/execution may still occur between the time that a branch instruction is issued and its result is generated from the execution unit which executes that branch instruction (e.g. the execution unit may have more than one pipeline stage).

The integer execution units 22A–22B are generally capable of handling integer arithmetic/logic operations, shifts, rotates, etc. At least the integer execution unit 22A is configured to execute branch instructions, and in some embodiments both of the integer execution units 22A–22B may handle branch instructions. In one implementation, only the execution unit 22B executes integer multiply and divide instructions although both may handle such instructions in other embodiments. The floating point execution units 24A–24B similarly execute the floating point instructions. The integer and floating point execution units 22A–22B and 24A–24B may read and write operands to and from the register file 28 in the illustrated embodiment, which may include both integer and floating point registers. The load/store units 26A–26B may generate load/store addresses in response to load/store instructions and perform cache accesses to read and write memory locations through the data cache 30 (and through the bus interface unit 32, as needed), transferring data to and from the registers in the register file 28 as well.

The instruction cache 12 may have any configuration and size, including direct mapped, fully associative, and set associative configurations. Similarly, the data cache 30 may have any configuration and size, including any of the above mentioned configurations. In one implementation, each of the instruction cache 12 and the data cache 30 may be 4 way set associative, 32 kilobyte (kb) caches including 32 byte cache lines. Both the instruction cache 12 and the data cache 30 are coupled to the bus interface unit 32 for transferring instructions and data into and out of the caches in response to misses, flushes, coherency activity on the bus, etc.

It is noted that, while FIG. 4 illustrates two integer execution units, two floating point execution units (FPUs), and two load/store (US) units, other embodiments may employ any number of each type of unit, and the number of one type may differ from the number of another type. It is noted that the embodiment of processor 10 is merely exemplary of one of many microarchitectures that may be employed in various embodiments. Any microarchitecture may be used.

Figure 5:
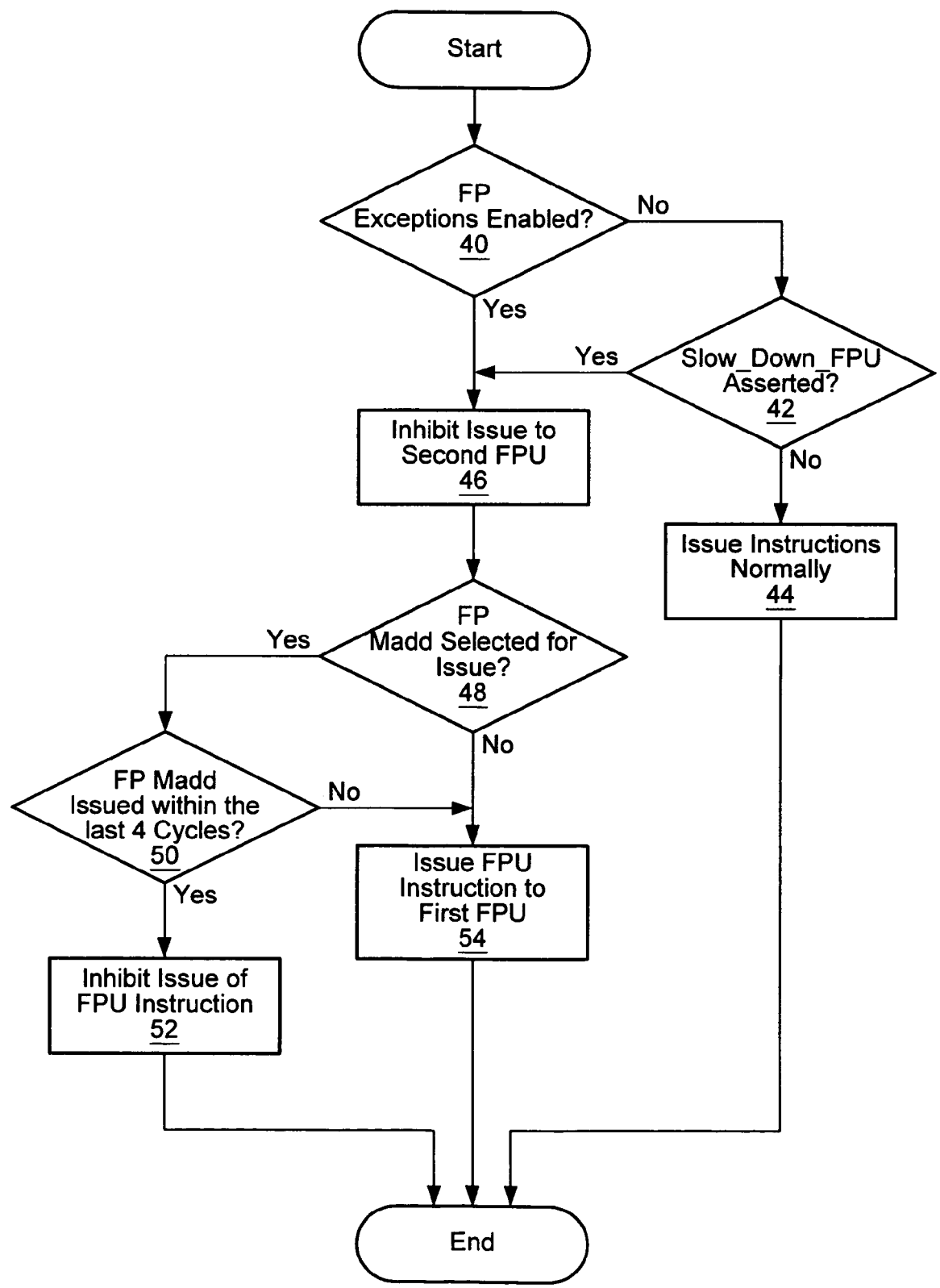
FIG. 5 is a flowchart illustrating operation of one embodiment of the fetch/decode/issue unit shown in FIG. 4.

Turning next to FIG. 5, a flowchart is shown illustrating operation of one embodiment of the issue circuit 34. Other embodiments are possible and contemplated. While the blocks shown in FIG. 5 are illustrated in a particular order for ease of understanding, any order may be used. Furthermore, blocks may be performed in parallel by combinatorial logic within the issue circuit 34.

The issue circuit 34 determines whether floating point exceptions are enabled (decision block 40) or the Slow_Down_FPU signal is asserted (decision block 42). If neither is true, then the issue circuit 34 may issue instructions normally (block 44). That is, the issue circuit 34 may issue instructions using the normal issue rules.

On the other hand, if either floating point exceptions are enabled or the Slow_Down_FPU signal is asserted, the issue circuit 34 may use issue rules in effect when floating point exceptions are enabled. That is, the Slow_Down_FPU signal may have the effect of causing the issue circuit 34 to behave as if floating point exceptions were enabled.

More particularly, in one embodiment, the issue circuit 34 may inhibit issue of instructions to the second floating point execution unit 24B (block 46). Additionally, if the issue circuit 34 selects a floating point Madd instruction for issue (decision block 48), the issue circuit 34 determines if a previous floating point Madd instruction was selected for issue within the preceding 4 clock cycles (decision block 50). If so, the floating point Madd instruction is not issued to the floating point execution unit 24A (block 52). If not, or if the selected floating point instruction is not a floating point Madd instruction, the instruction is issued to the floating point execution unit 24A (block 54).

It is noted that, while the present embodiment operates as if floating point exceptions were enabled, other embodiments may have different exceptions which may be enabled and which may affect instruction issue. In such embodiments, the processor may operate as if those exceptions were enabled in response to one or more fuses being blown.

Reducing MTOPS by Blowing Fuses

Figure 6:
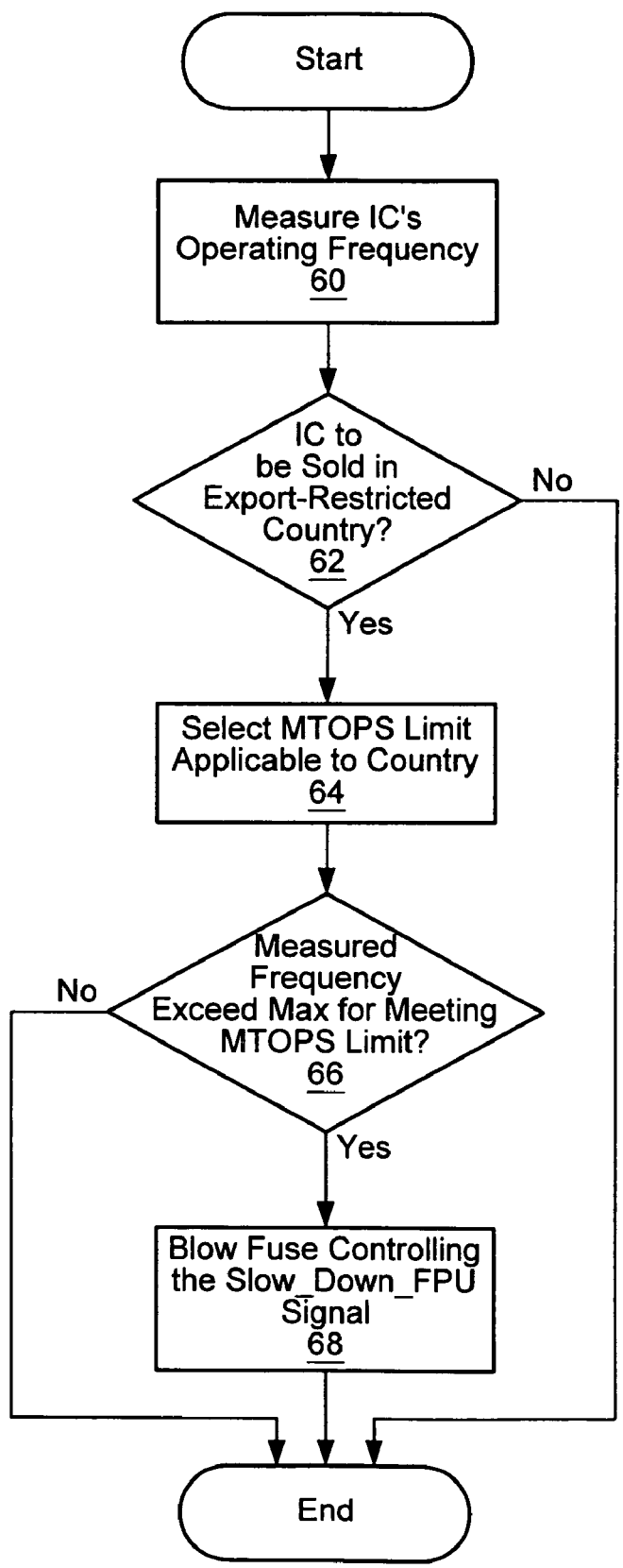
FIG. 6 is a flowchart illustrating one embodiment fuse blowing during test of embodiments of the integrated circuits shown in FIGS. 1–3.

Turning now to FIG. 6, a flowchart is shown illustrating one embodiment of a method for reducing the MTOPS of the integrated circuit 100 to meet export restrictions. Other embodiments are possible and contemplated. The method may be performed during testing of the integrated circuit 100 to determine its operating frequency.

The integrated circuit 100 is tested to determine its operating frequency (block 60). If the integrated circuit 100 is not to be exported, or is to be exported to a country which is not export-restricted (decision block 62, "no" leg), then no fuses are blown and the integrated circuit 100 may proceed to packaging. On the other hand, if the integrated circuit 100 is to be exported to an export-restricted country (decision block 62, "yes" leg), the MTOPS limit applicable to that country is selected (block 64). As mentioned above, different countries may be in different tiers of the U.S. government's export restriction policies. While the present discussion describes targeting a particular country, the tier may actually be targeted. Integrated circuits may be collected for export to any country on a given tier.

If the measured operating frequency (from block 60) results in MTOPS which do not exceed the selected MTOPS limit (decision block 66, "no" leg), then again no fuses are blown and the integrated circuit 100 may proceed to packaging. For example, a maximum operating frequency which meets the MTOPS limit may be calculated, and may be compared to the measured operating frequency. If the measured operating frequency results in MTOPS that do exceed the selected MTOPS limit (decision block 66, "yes" leg), then the fuse controlling the Slow_Down_FPU signal is blown (block 68). The integrated circuit 100 with the fuse blown may then proceed to packaging.

The embodiment of FIG. 6 may be used for the embodiment of FIG. 1, or embodiments of FIGS. 2 and 3 in which the Slow_Down_FPU signal is shared for each of the processors 10A–10B or 10A–10D, respectively. For embodiments in which multiple separate Slow_Down_FPU signals are used for different processors 10A–10B or 10A–10D, the embodiment of FIG. 7 may be used.

Figure 7:
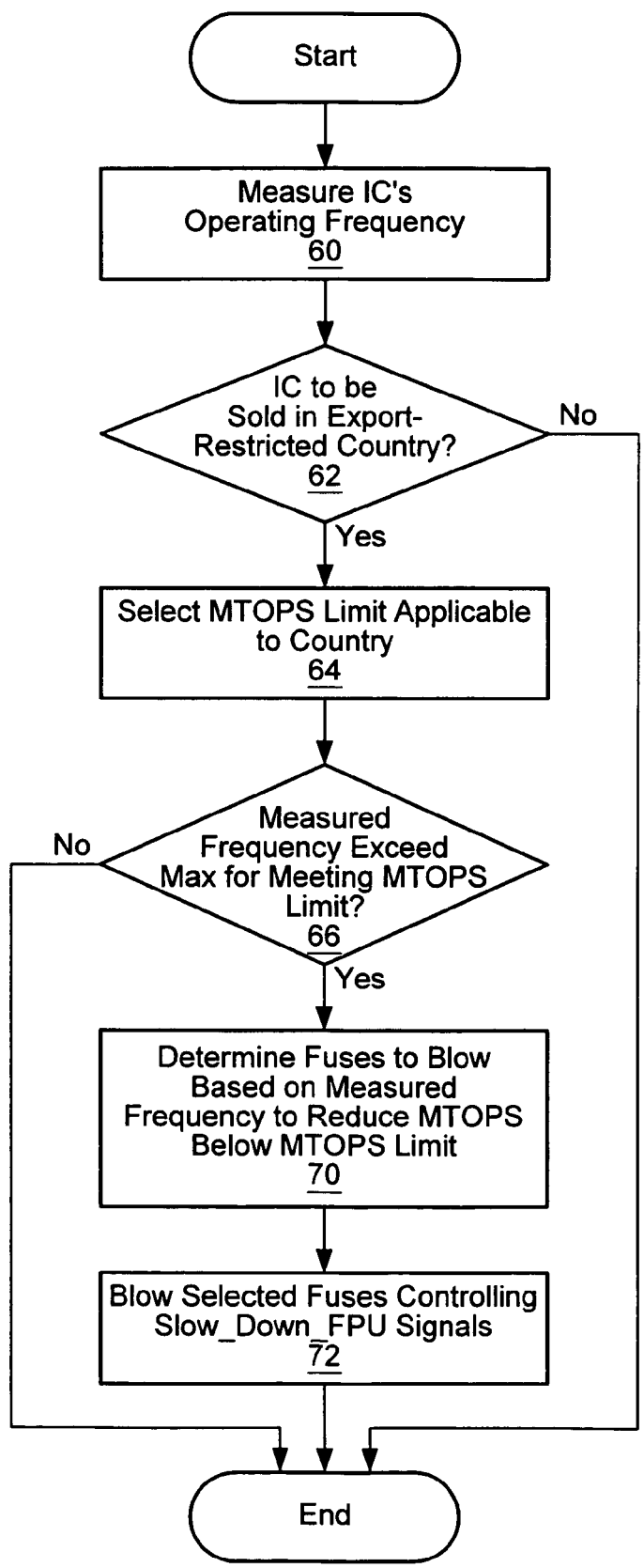
FIG. 7 is a flowchart illustrating a second embodiment fuse blowing during test of embodiments of the integrated circuits shown in FIGS. 1–3.

In the embodiment of FIG. 7, the integrated circuit's operating frequency may be measured and used to determine if the MTOPS of the integrated circuit 100 exceeds the MTOPS limit for a selected export country or tier (blocks 60, 62, 64, and 66). If the MTOPS limit is exceeded, then the method includes determine which fuses to blow, based on the measured operating frequency of the integrated circuit 100, to reduce the MTOPS below the MTOP limit (block 70). For example, the maximum operating frequencies for which each combination of fuses being blown results in MTOPS which meet the MTOPS limit may be calculated, and these frequencies may be compared to the measured operating frequency to select the fuses to blow. The selected fuses may then be blown, thus causing the assertion of one or more Slow_Down_FPU signals (block 72).

It is noted that, while MTOPS are used as an example of an export restriction, the above method and integrated circuit may be used to meet other export restrictions imposed by any country.

Exemplary Fuse

Turning next to FIG. 8, a circuit diagram is shown illustrating one exemplary embodiment of a fuse 80 and related circuitry which may be included in the fuses 102 for generating a Slow_Down_FPU signal. Other embodiments are possible and contemplated. In the embodiment of FIG. 8, an n-type metal-oxide-semiconductor (NMOS) transistor is coupled between the fuse 80 and ground, and has a gate terminal coupled to optional logic 82, which is further coupled to receive the reset signal. A p-type MOS (PMOS) transistor is coupled between the fuse 80 and the supply voltage ($V_{dd}$), and has a gate terminal coupled to optional logic 84, which is further coupled to receive the reset signal. The node between the fuse 80 and the PMOS transistor is coupled to a passgate 86 clocked by the logical AND of the reset signal and a clock Clk. The passgate 86 is further coupled to a latch 88 comprising cross-coupled inverters and an output inverter which outputs the Slow_Down_FPU signal.

In the illustrated embodiment, the state of the fuse 80 is sampled during reset. More particularly, the PMOS and NMOS transistors may both be activated in response to the reset signal being asserted. The NMOS transistor may be sized larger than the PMOS transistor, so that if the fuse 80 has not been blown, the input to the latch 88 is a binary zero and the Slow_Down_FPU signal is deasserted. If the fuse 80 has been blown, the PMOS transistor causes the input to the latch 88 to be a binary one and the Slow_Down_FPU signal is asserted. In other embodiments, the Slow_Down_FPU signal may be defined to be asserted low and the output inverter of the latch 88 may be deleted.

In the embodiment of FIG. 8, the fuse 80 may be a wire in the top layer of metal, which may be laser cut (or cut in some other fashion) to blow the fuse 80. As mentioned above, in various embodiments, fuses may be formed from many different types of materials.

The logic 82 and 84 may be configured to combine the reset signal with other signals to activate the PMOS and NMOS transistors, if desired. If no other signals are used, and the reset signal is asserted high, the logic 84 may be an inverter and the logic 82 may be deleted.

It is noted that the circuitry shown in FIG. 8 is but one of numerous examples of how a fuse may be used to generate the Slow_Down_FPU signals. Any circuitry may be used in various embodiments. Various embodiments may sample the fuse state at reset, or may use the fuse state continuously, to generate the Slow_Down_FPU signals.

Computer Accessible Medium

Figure 9:
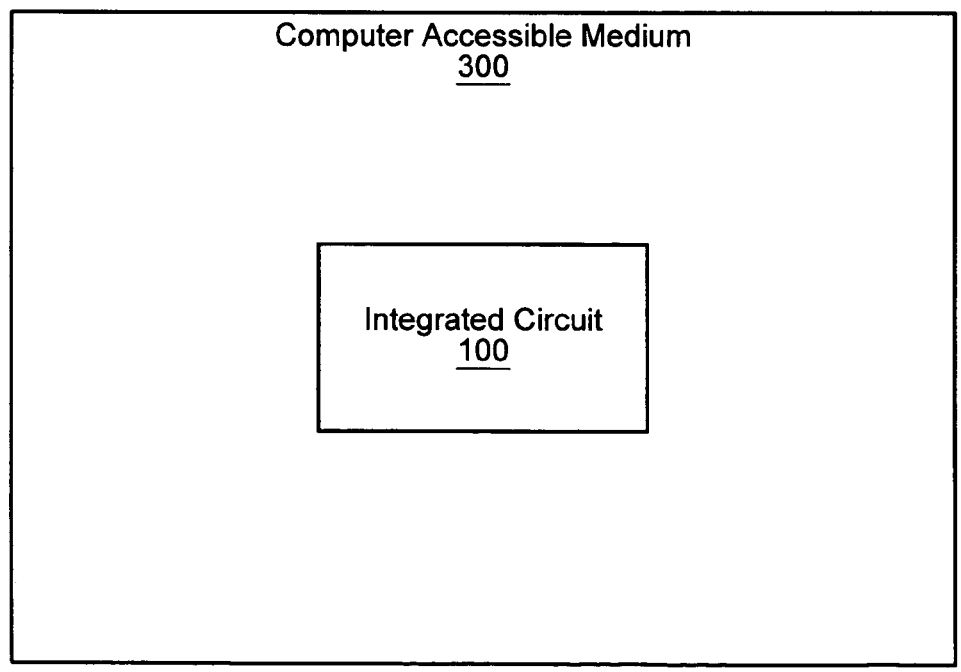
FIG. 9 is a block diagram of one embodiment of a computer accessible medium.

Turning next to FIG. 9, a block diagram of a computer accessible medium 300 including one or more data structures representative of the circuitry comprising the integrated circuit 100 (e.g. any of the embodiments shown in FIGS. 1, 2, or 3) is shown. Generally speaking, a computer accessible medium may include storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer accessible medium 300 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlist(s) comprising lists of gates from a synthesis library. The netlist(s) comprise a set of gates which also represent the functionality of the hardware comprising the circuitry. The netlist(s) may then be placed and routed to produce one or more data set(s) describing geometric shapes to be applied to masks. The masks may then be used in various semiconductor fabrication steps to produce a semiconductor circuit or circuits corresponding to the circuitry. Alternatively, the data structure(s) on computer accessible medium 300 may be the netlist(s) (with or without the synthesis library) or the data set(s), as desired. In yet another alternative, the data structures may comprise the output of a schematic program, or netlist(s) or data set(s) derived therefrom.

While computer accessible medium 300 includes a representation of the integrated circuit 100, other embodiments may include a representation of any portion of the integrated circuit 100 (e.g. processors 10, 10A, 10B, 10C, 10D, fuses 102 (including fuse 80 and related circuitry in one embodiment), memory controller 106, L2 cache 104, I/O bridges 110A–110B, I/O interfaces 112A–112D, etc.)

Numerous variations and modifications will become apparent to those skilled in the art once the above disclosure is fully appreciated. It is intended that the following claims be interpreted to embrace all such variations and modifications.

What is claimed is:

1. An integrated circuit comprising:
 a first processor coupled to operate at a first issue rate to issue instructions or at a second issue rate to issue instructions, in which the first issue rate is faster than the second issue rate;
 a first fusing circuit coupled to the first processor in which when the first fusing circuit is in a first state, the first processor is to operate at the first issue rate and when the first fusing circuit is in a second state, the first processor is to operate at the second issue rate, the second state being an impaired state for the first processor; and
 a second processor coupled to the first fusing circuit to operate at the first issue rate or the second issue rate responsive to the state of the first fusing circuit.

2. The integrated circuit as recited in claim 1 further comprising:
 a second fusing circuit having the first state and the second state; and
 a third processor coupled to the second fusing circuit to operate at the first issue rate or the second issue rate responsive to the state of the second fusing circuit.

3. An integrated circuit comprising:
 a processor coupled to operate at a first issue rate to issue instructions or at a second issue rate to issue instructions, in which the first issue rate is faster than the second issue rate, wherein the processor includes two or more execution units to execute instructions; and
 a fusing circuit coupled to the processor in which when the fusing circuit is in a first state, the processor is to issue instructions to the execution units at the first issue rate and when the fusing circuit is in a second state, the processor is to issue instructions at the second issue rate for at least one of the execution units, but not all of the execution units, the second state being an impaired state for the processor.

4. The integrated circuit as recited in claim 3 wherein the execution units are floating point execution units configured to execute floating point instructions.

5. The integrated circuit as recited in claim 3 wherein the processor operates at a reduced clock frequency if operating at the second issue rate.

6. The integrated circuit as recited in claim 3 wherein the processor is configured to operate in a floating point exceptions enabled mode if operating at the second issue rate.

7. An integrated circuit comprising:
 a first fuse;
 a first processor coupled to execute a particular number of instructions in a period of time responsive to a conductive state of the first fuse and to execute less than the particular number of instructions in the period of time responsive to a non-conductive state of the first fuse; and
 a second processor coupled to execute the particular number of instructions in the period of time responsive to the conductive state of the first fuse and to execute less than the particular number of instructions in the period of time responsive to the non-conductive state of the first fuse.

8. The integrated circuit as recited in claim 7 further comprising:
 a second fuse; and
 a third processor coupled to execute the particular number of instructions in the period of time responsive to a conductive state of the second fuse and to execute less than the particular number of instructions in the period of time responsive to a non-conductive state of the second fuse.

9. An integrated circuit comprising:
 a processor coupled to operate at a first issue rate to issue a particular number of instructions in a period of time and to operate at a second issue rate to issue instructions at less than the first issue rate, wherein the processor includes two or more floating point execution units to execute floating point instructions; and
 a fuse coupled to the processor in which when the fuse is in a first state, the processor is to issue instructions to the floating point execution units at the first issue rate and when the fuse is in a second state, the processor is to issue instructions at the second issue rate for at least one of the floating point execution units, but not all of the floating point execution units.

10. The integrated circuit as recited in claim 9 wherein the processor operates at a reduced clock frequency to issue instructions at the second issue rate.

11. The integrated circuit as recited in claim 9 wherein the processor is configured to operate in a floating point exceptions enabled mode when operating at the second issue rate.

* * * * *